United States Patent
Maney et al.

(10) Patent No.: US 12,361,469 B1
(45) Date of Patent: Jul. 15, 2025

(54) ELECTRONIC SERVICE SYSTEMS AND METHODS

(71) Applicant: United Services Automobile Association (USAA), San Antonio, TX (US)

(72) Inventors: Will Kerns Maney, San Antonio, TX (US); Zachery C. Lake, Aubrey, TX (US); Yevgeniy Viatcheslavovich Khmelev, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 417 days.

(21) Appl. No.: 17/549,400

(22) Filed: Dec. 13, 2021

Related U.S. Application Data

(60) Provisional application No. 63/125,224, filed on Dec. 14, 2020.

(51) Int. Cl.
| | |
|---|---|
| *G06Q 30/00* | (2023.01) |
| *G06F 9/54* | (2006.01) |
| *G06F 16/9538* | (2019.01) |
| *G06Q 20/12* | (2012.01) |
| *G06Q 20/22* | (2012.01) |
| *G06Q 30/0601* | (2023.01) |

(52) U.S. Cl.
CPC ......... *G06Q 30/0633* (2013.01); *G06F 9/541* (2013.01); *G06F 16/9538* (2019.01); *G06Q 20/12* (2013.01); *G06Q 20/227* (2013.01)

(58) Field of Classification Search
CPC .. G06Q 30/0633; G06Q 20/12; G06Q 20/227; G06F 16/9538; G06F 9/541
USPC ................................................ 705/26.1–27.2
See application file for complete search history.

(56) References Cited

U.S. PATENT DOCUMENTS

| | | | |
|---|---|---|---|
| 2012/0109734 A1* | 5/2012 | Fordyce, III | G06Q 30/0239 705/14.25 |
| 2021/0090147 A1* | 3/2021 | Kochhar | G06Q 30/0613 |

OTHER PUBLICATIONS

O. Tounekti, A. Ruiz-Martínez and A. F. Skarmeta Gómez, "Users Supporting Multiple (Mobile) Electronic Payment Systems in Online Purchases: An Empirical Study of Their Payment Transaction Preferences," in IEEE Access, vol. 8, pp. 735-766, 2020, doi: 10.1109/ACCESS.2019.2961785. (Year: 2020).*

* cited by examiner

*Primary Examiner* — Anand Loharikar
(74) *Attorney, Agent, or Firm* — Fletcher Yoder, P.C.

(57) ABSTRACT

One or more tangible, non-transitory, computer-readable media, include instructions that, when executed by one or more processors, cause the one or more processors to receive, from an application programming interface (API), a list of objects corresponding to an online transaction, retrieve a classification lookup table based on the list of objects, identify a class of each object in the list of objects using the classification lookup table, and provide, to the API, the class of each object for processing of the online transaction.

17 Claims, 5 Drawing Sheets

ELECTRONIC SERVICE SYSTEMS AND METHODS

CROSS-REFERENCE TO RELATED APPLICATION

The present application claims the benefit of and priority to U.S. Provisional Patent Application Ser. No. 63/125,224, titled "ELECTRONIC SERVICE SYSTEMS AND METHODS," which was filed on Dec. 14, 2020, and which is herein incorporated by reference in its entirety for all purposes.

BACKGROUND

An online store front facilitates a user's ability to search for and purchase products. The store front provides access to a variety of products, such as recreational products, furniture, toiletries, cleaning supplies, medical supplies, pet supplies, and electronics, among others. After selecting products for purchase, the products are typically displayed to the user for the user's review in the store front. The products are identified by name, and a price for each product is displayed. However, additional information regarding the products and electronic services that may be offered and performed for the products is not included. It is now recognized that there is a need for interacting with and improving the online store front.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, one or more tangible, non-transitory, computer-readable media, include instructions that, when executed by one or more processors, cause the one or more processors to receive, from an application programming interface (API), a list of objects corresponding to an online transaction, retrieve a classification lookup table based on the list of objects, identify a class of each object in the list of objects using the classification lookup table, and provide, to the API, the class of each object for processing of the online transaction.

In certain embodiments, a method of providing electronic services includes receiving an item list of a shopping cart from a store front configured to provide the shopping cart, where the item list comprises a plurality of items selected by a user. The method includes obtaining one or more electronic regulations relevant to the item list from an electronic regulation database, obtaining additional information about the user from a user profile database, traversing the item list to identify one or more items of the plurality of items in one or more classes defined in the one or more electronic regulations, based on the additional information about the user, or both, and providing an indication of one or more preferred payment methods to the shopping cart for each item of the one or more items identified in the item list.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
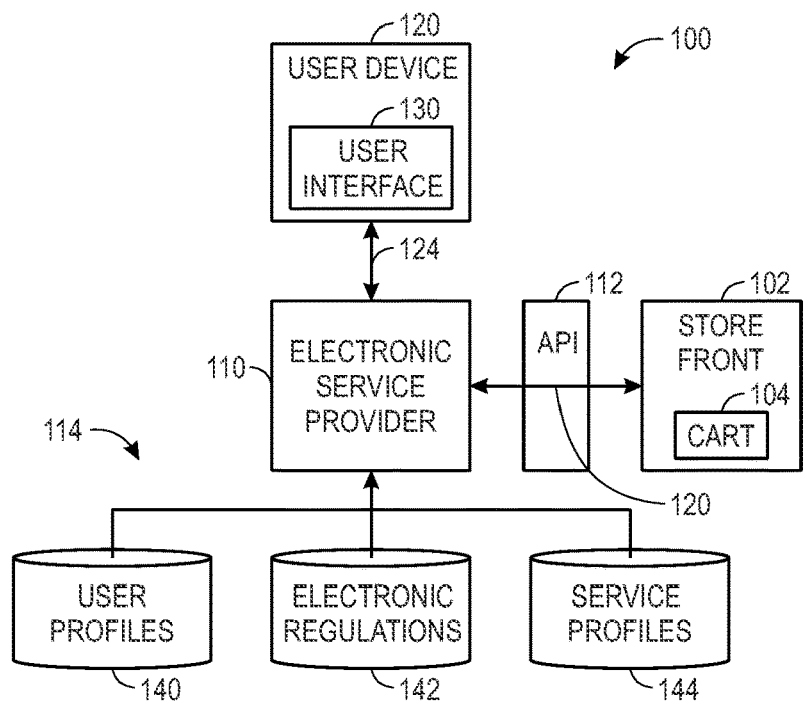
FIG. 1 is a block diagram of an electronic service system and an online store front, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to an electronic service provider, and more particularly to an electronic service provider that interacts with an online store front to provide electronic services related to items (e.g., objects) corresponding to an online transaction. The online store front may allow the user to search for and purchase a variety of items, such as recreational products, furniture, toiletries, cleaning supplies, medical supplies, pet supplies, electronics, and other suitable items. After selecting items for purchase, the items may be displayed to the user in a cart (e.g., a virtual shopping cart) of the store front. For example, information related to each item may be displayed via the shopping cart. Such information may include identifying information (e.g., a name of the product), a price, taxes, shipping costs, and other suitable information for each item. The electronic service provider described herein may supplement such information by recommending and/or providing electronic services for certain items of the user's shopping cart.

The electronic service provider may obtain information and profiles (e.g., lookup tables) from databases and compare the information to the items of the user's shopping cart. For example, the electronic service provider may obtain information about the user based on a user profile (e.g., a user profile lookup table) retrieved from a user profile database, information regarding electronic regulations from an electronic regulations database, information related to potential electronic services from a service profile database, and other/additional information from other suitable databases. The electronic service provider may compare the obtained information to the items of the user's shopping cart (e.g., to item data of the items) to determine electronic services that may be offered and/or provided for each item.

For example, the electronic service provider may traverse an item list (e.g., a list of objects) of the user's shopping cart to identify items in classes defined in the electronic regulations (e.g., classification lookup tables) and/or based on information about the user. The electronic regulations may identify the types of items that are purchasable via certain payment methods. More specifically, the classes of items described herein may generally identify characteristics that qualify items for purchase via the payment methods. By way of example, certain items may be purchasable via a health savings account (HSA), which may be tax-free and used to purchase items related to healthcare. The electronic regulations may identify items, characteristics of items, and/or classes of items that qualify for purchase via the HSA, such as items related to first-aid, preventative healthcare, fitness, service animals, and other healthcare items. The electronic service provider may identify the items that qualify for purchase via the HSA by matching the items of the item list to the items, characteristics, and/or classes specified in the electronic regulations and provide an indication of the HSA as the preferred payment method for those items. Doing so allows the user to select payment options that may otherwise be unavailable, that the user may be unaware of, and/or that may otherwise be difficult to select. Additionally, the electronic service provider may provide multiple indications of preferred payment methods for the items of the shopping cart, such that the most suitable payment method for each item is recommended (e.g., the most financially sensible payment option). As described herein, in some embodiments, the electronic service provider may identify classes of the items via machine learning models.

Additionally, the electronic service provider may receive shipping information of the user's shopping cart (e.g., in addition to the item list) and offer and/or provide electronic services based on the shipping information. For example, the electronic service provider may obtain additional information about the user (e.g., from the user profile database) including residences and an inventory list for each residence. The electronic service provider may traverse the item list and shipping information to identify items being shipped to the user's residences. The electronic service provider may provide a prompt allowing the user to add the items to existing inventory lists for the residences and/or to generate new inventory lists including the items. Doing so may facilitate generation and maintenance of accurate inventory lists for the user, thereby enhancing the user's experience with respect to the inventory lists and the items of the online store front. Additionally, the electronic service provider may provide additional electronic services based on the updated and/or new inventory lists, such as updated/new insurance offerings for the residences (e.g., renter's insurance, homeowner's insurance). In some embodiments, the electronic service provider may identify the additional electronic services based on the shipping information via machine learning models. In certain embodiments, the electronic service provider may automatically add the items to certain inventory lists based on the items being shipping to residences corresponding to the inventory lists and/or may automatically generate new inventory lists for such residences.

In certain embodiments, the additional information about the user obtained by the electronic service provider (e.g., from the user profile database) may include assets of the user. Based on items of the item list being shipped to the user's assets, the electronic service provider may provide a prompt allowing the user to attribute the items to the user's assets. For example, if the user's assets include a rental property, the electronic service provider may determine that the user may want to attribute the items to rental property based on the items being shipped to the rental property. Accordingly, the electronic service provider may provide a prompt allowing the user to accept or decline attributing the items to the rental property. After receiving confirmation from the user that the items should be attributed to the rental property, the electronic service provider may attribute the items as such. In certain embodiments, the electronic service provider may automatically attribute the items to certain assets based on the items being shipping to those assets.

In some embodiments, the electronic service provider may obtain information regarding potential shipping-related services for items of the item list, such as alternative shipping methods/providers, insured shipping options, and other suitable shipping-related services. The electronic service provider may traverse the item list to identify items that qualify for the shipping-related services and provide a prompt to the user allowing the user to select, approve, and/or decline the shipping-related services. In certain embodiments, the electronic service provider may automatically implement the shipping-related services for the items.

The electronic service provider may interface with the online store front via an application programming interface (API) that facilitates interaction and communication between the electronic service provider and the online store front. The API may be specific to a type of the online store front and/or a specific, single online store front. For example, each online store front may require a unique API to interface with the electronic service provider (e.g., a common electronic service provider). The API may enable the electronic service provider to receive the item list, shipping information, and other suitable data from the online store front (e.g., from the shopping cart of the online store front). Additionally, the API may enable the electronic service provider to provide information regarding electronic services to the online store front, such as indications of preferred payment methods, shipping-related services, and/or other suitable information regarding electronic services.

In certain embodiments, the electronic service provider may provide prompts and/or representations of a user interface allowing the user to approve electronic services, decline electronic services, or otherwise interface with the electronic service provider. For example, the electronic service provider may provide the prompts to a device of the user that is configured to display the prompts and/or representations via a user interface. The user may interact with the user interface of the device to provide feedback to the electronic service provider. Based on the feedback, the electronic service provider may implement certain electronic services, offer electronic services, and/or provide additional information to the online store front. In certain embodiments, the electronic service provider may train and/or enhance a machine learning model based on the feedback from the user, such as to add to a training data set indicating probable user selections of electronic services. In some embodiments, an electronic service system may include the electronic service provider, the API, the user profile database, the electronic regulations database, the service profile database, the online store front, the shopping cart of the online store front, other suitable components configured to enable the electronic service system (e.g., via the electronic service provider) to provide electronic services based on information received from the online store front, or any combination thereof.

With the foregoing in mind, FIG. 1 is a block diagram of an electronic service system 100 and an online store front 102, according to embodiments of the present disclosure. The electronic service system 100 may receive information from the online store front 102, such as an item list and/or shipping information, and recommend and/or provide electronic services based on the received information. The online store front 102 may provide a user access to a variety of items (e.g., products, objects) purchasable online. For example, the user may search the online store front 102 and select items for purchase. The items may be displayed as a list (e.g., item list, object list, product list) in a cart 104 (e.g., a shopping cart), such that the cart 104 may represent a virtual shopping cart that holds the user's selected items prior to, during, and/or after purchase. As described herein, the electronic services that may be identified, recommended, and/or provided by the electronic service system 100 may include preferred payment methods, adding items to inventory lists associated with the user's assets (e.g., residences), shipping-related services, and/or other suitable electronic services. In certain embodiments, the electronic service system 100 may include the online store front 102 or portions of the online store front 102 (e.g., the cart 104).

As illustrated, the electronic service system 100 includes an electronic service provider 110, an application programming interface (API) 112, and databases 114. In certain embodiments, the API 112 and/or one or more of the databases 114 may be omitted from the electronic service system 100. The electronic service provider 110 may receive information from the online store front 102 (e.g., from the cart 104) via the API 112, as indicated by arrow 120. Such information may include the item list, shipping information corresponding to the online transaction, and other suitable information corresponding to the items selected for purchase. The electronic service provider 110 may determine electronic services to be offered and/or provided based on the information received from the online store front 102 and/or based on information obtained from the databases 114. After determining the electronic services, the electronic service provider 110 may provide indications of the electronic services to the store front 102 (e.g., to the cart 104) via the API 112, as indicated by the arrow 120, and/or to a user device 122, as indicated by arrow 124.

The user device 120 may include a user interface 130 that displays representations and/or indications received from the electronic service provider 110. For example, the user interface 130 may display the representations of user interfaces depicted in FIGS. 3, 5, 7, and 9, as described herein. In certain embodiments, the user interface 130 may display the store front 102 and/or portions of the store front 102 (e.g., the cart 104). In some embodiments, an indication provided by the electronic service provider 110 may supplement and/or overlay the store front 102, such that the user interface 130 may display the store front 102 and indications received from the electronic service provider 110 simultaneously. The user may interact with the user interface 130 to interact with the electronic service provider 110 and the electronic service system 100 generally. For example, as described herein, the electronic service provider 110 may provide selectable options to the user device to approve or decline electronic services. The selectable options may be provided for each item of the cart 104 and/or for the online transaction generally. The user device 120 may be any electronic device suitable for displaying the user interface 130, such as a personal computer (e.g., a desktop or laptop), a smart phone, a smart watch, and so forth. In some embodiments, the user device 120 may include a touch screen that displays the user interface 130. In certain embodiments, the electronic service provider 110 may train and/or enhance a machine learning model based on the feedback from the user, such as to add to a training data set indicating probable user selections of electronic services.

The API 112 may facilitate interaction and communication between the electronic service provider 110 and the online store front 102. For example, the API 112 may receive information (e.g., the item list, shipping information) from the online store front 102 and hold the information for retrieval by the electronic service provider 110 and/or may pass the information directly to the electronic service provider 110. Additionally, the API 112 may receive information (e.g., indications of electronic services, representations of a user interface) from the electronic service provider 110 and hold the information for retrieval by the store front 102 and/or may pass the information directly to the store front 102. The API 112 may be specific to a type of the online store front 102. For example, in embodiments with multiple store fronts 102, each online store front 102 may require a unique API 112 to interface with the electronic service provider 110, which may be a common electronic service provider that communicates with and provides indications of electronic services to the multiple store fronts 102.

As illustrated, the databases 114 include a user profile database 140, an electronic regulations database 142, and a service profiles database 144. The user profiles database 140 may store information and records regarding user profiles. Each user profile may include information about a user or a group of users (e.g., a family, a company, an organization, a social group). Such information may include names, birthdays, ages, service and/or product information related to items owned by the users or previously owned by the users (e.g., information regarding and/or related to services and/or products that may potentially be provided by the electronic service provider 110), assets, inventory lists, occupational information, and other information relevant to electronic services that may be provided by the electronic service provider 110.

The electronic regulations database 142 may store information regarding electronic regulations relevant to electronic services that may be provided by the electronic service provider 110. For example, the electronic regulations may govern/determine which products and/or electronic services may be provided by the electronic service provider 110 to certain users. Such electronic regulations may include government regulations, regulations set by the electronic service provider 110 (e.g., regulations internal to the electronic service provider 110), industry regulations (e.g., regulations set by an industry including the electronic service provider 110), regulations that identify classes of items that are purchasable via certain payment methods, and other suitable electronic regulations. Additionally, the electronic regulations may be organized in electronic regulation lookup tables. For example, the electronic regulations database 142 may include classification lookup tables that identify the classes of items (e.g., objects) purchasable via certain payment methods. Each classification lookup table may identify characteristics of items purchasable via a payment method. By way of example, certain items may be purchasable via a health savings account (HSA), which may be tax-free and used to purchase items related to healthcare. A classification lookup table may identify items and/or characteristics of items that belong to a class qualified for purchase via the HSA, such as items related to first-aid, preventative healthcare, fitness, service animals, and other healthcare items. The electronic regulations lookup tables may include other suitable classification lookup tables, such as tables classifying items that should not be taxed (e.g., to automatically ensure that the items are not taxed at the store front or to provide an indication to the user that the items should not be taxed). In certain embodiments, the electronic service provider 110 may identify classes for the items based on the electronic regulations via a machine learning model.

The service profiles database 144 may store service profiles including information regarding electronic services and/or products that may be offered and/or provided by the electronic service provider 110. For example, the information included in the service profiles may identify information that qualifies users for certain electronic services and/or products, such as tax services/products, shipping services, insurance services/offerings, and other suitable electronic services and electronic products. Additionally, the information regarding service profiles may be included in service lookup tables that may be referenced by the electronic service provider 110 (e.g., the service profiles database 144 may store the service lookup tables).

In certain embodiments, the electronic service provider 110, or the electronic service system 100 generally, may include a controller that includes one or more processors (e.g., microprocessors) and one or more memory and/or storage devices. The one or more processors may execute software programs and/or instructions to facilitate determining and providing electronic services. Moreover, the one or more processors may include multiple microprocessors, one or more "general-purpose" microprocessors, one or more special-purpose microprocessors, and/or one or more application specific integrated circuits (ASICS), or some combination thereof. For example, the one or more processors may include one or more reduced instruction set (RISC) processors. The one or more memory devices may store information such as control software, look up tables, configuration data, databases, etc. The one or more memory devices may include a tangible, non-transitory, machine-readable-medium, such as a volatile memory (e.g., a random access memory (RAM)) and/or a nonvolatile memory (e.g., a read-only memory (ROM)). The one or more memory devices may store a variety of information and may be used for various purposes. For example, the one or more memory devices may store machine-readable and/or processor-executable instructions (e.g., firmware or software) for the one or more processors, respectively, to execute, such as instructions for determining and providing electronic services. The one or more memory devices may include one or more storage devices (e.g., nonvolatile storage devices) that may include read-only memory (ROM), flash memory, a hard drive, or any other suitable optical, magnetic, or solid-state storage medium, or a combination thereof. In some embodiments, the electronic service provider 110, or the electronic service system 100 generally, may include multiple controllers.

Accordingly, as will be discussed herein, the electronic service provider 110 (e.g., via the one or more processors and/or one or more tangible, non-transitory, computer-readable media) may receive, from the API 112, a list of objects (e.g., an item list) corresponding to an online transaction, retrieve a classification lookup table based on the list of objects, identify a class of each object in the list of objects using the classification lookup table, and provide, to the API 112, the class of each object for processing of the online transaction.

Some analysis processes (e.g., identifying classes for the items, identifying electronic services for the items) described above may be performed by machine learning circuitry using the transaction data and the additional information about the user. The machine learning circuitry (e.g., circuitry used to implement machine learning algorithms or logic) may access the transaction data and the additional information to identify patterns, correlations, or trends associated with the data. The transaction data may be sourced from a multitude of diverse online services and databases, new data patterns not previously attainable based on transaction analysis without machine learning may emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry may implement different forms of machine learning. In some embodiments, a supervised machine learning may be implemented. In supervised machine learning, the mathematical model of a set of transaction data contains both the inputs and the desired outputs. The set of transaction data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. an item of the user's shopping cart and an item in the training set) are.

Additionally and/or alternatively, in some situations, it may be beneficial for the machine-learning circuitry to utilize unsupervised learning (e.g., when particular output types are not known). Unsupervised learning algorithms take a set of transaction data that contains only inputs, and find structure in the data, like grouping or clustering of transaction data. The algorithms, therefore, learn from test data that has not been labeled, classified or categorized. Instead of responding to feedback, unsupervised learning algorithms identify commonalities in the transaction data and react based on the presence or absence of such commonalities in each new piece of transaction data.

Cluster analysis is the assignment of a set of observations (e.g., transaction datasets) into subsets (called clusters) so that observations within the same cluster are similar according to one or more predesignated criteria, while observations drawn from different clusters are dissimilar. Different clustering techniques make different assumptions on the structure of the transaction data, often defined by some similarity metric and evaluated, for example, by internal compactness, or the similarity between users of the same cluster, and separation, the difference between clusters. Predictions or correlations may be derived by the machine learning circuitry. For example, groupings and/or other classifications of the transaction data may be used to identify potential electronic services. The predictions may be provided to downstream applications, which may perform actions based upon the predictions. The actions that are performed may be mediated through a controller, either directly or through a coupled secure system, that has access to the transaction data and information about the user.

Figure 2:
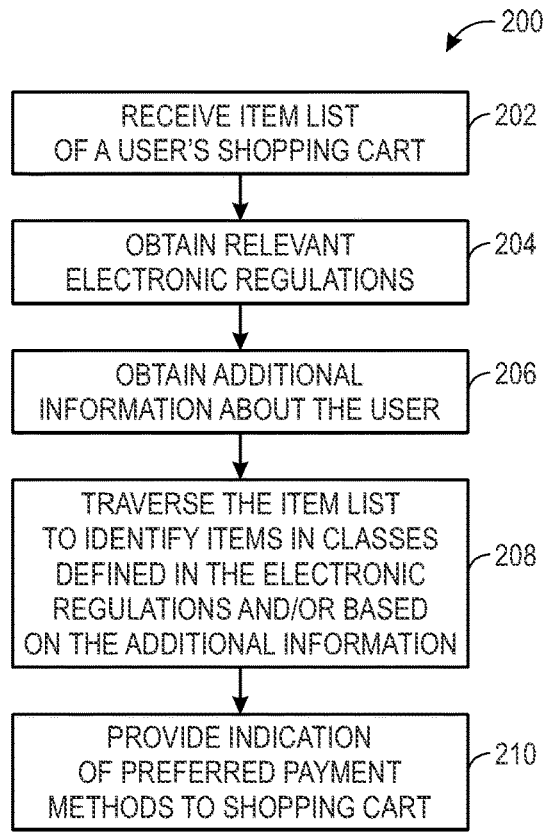
FIG. 2 is a flowchart illustrating a method for providing an indication of preferred payment methods for items of a user's shopping cart, which may be performed via the electronic service system of FIG. 1, according to embodiments of the present disclosure.

FIG. 2 is a flowchart illustrating a method 200 for providing an indication of preferred payment methods for items of the cart 104, which may be performed via the electronic service system 100 of FIG. 1 (e.g., performed via the electronic service provider 110 of the electronic service system 100), according to embodiments of the present disclosure. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as the one or more memory devices, using a processor, such as the one or more processors.

As illustrated, in process block 202, the electronic service provider 110 may receive an item list (e.g., a list of items, a list of objects, a list of products) of the cart 104 of the store front 102, such as via the API 112. As described herein, the API 112 may receive the item list from the store front 102 and transmit the item list to the electronic service provider 110. The item list may include information for each item, such as a name, an item type (e.g., healthcare, recreational, decorative, electronic), a unique identifier (e.g., a serial number, a model number), a scannable code (e.g., a barcode, a QR code), a price, tax information (e.g., tax costs, tax types (e.g., state sales tax, international taxes)), shipping costs, shipping types (e.g., local shipping, interstate shipping, international shipping, overnight shipping), and other suitable information for each item. Additionally, the item list may correspond to an online transaction of a user. Accordingly, in process block 202, the electronic service provider may receive additional information regarding the online transaction, such as information identifying the user (e.g., name, location).

In process block 204, the electronic service provider 110 may obtain electronic regulations, such as electronic regulations relevant to the online transaction. The electronic service provider 110 may obtain the electronic regulations from the electronic regulations database 142, such as by referencing and/or traversing electronic regulation lookup tables (e.g., classification lookup tables, object lookup tables). The electronic regulations may identify classes of items (e.g., objects) purchasable via certain payment methods and may include additional information relevant to the online transaction. For example, the classes of items may indicate which items are purchasable via an HSA, a credit card, a debit card, a gift card, state and/or federal aid, private funds (e.g., funds private to the user, company funds), public funds (e.g., government funds, organization funds), and/or other suitable payment methods.

In process block 206, the electronic service provider 110 may obtain additional information about the user, such as information and records in a user profile stored in the user profiles database 140. In certain embodiments, the user profile may be a user profile lookup table that may be referenced and/or traversed by the electronic service provider 110 to obtain the information about the user. As described herein, the additional information about the user may include a name, birthday, age, service and/or product information owned by the user or previously owned by the user (e.g., information regarding and/or related to services and/or products that may potentially be provided by the electronic service provider 110), assets, inventory lists, occupational information, and other information relevant to electronic services that may be provided by the electronic service provider 110.

In process block 208, the electronic service provider 110 may traverse the item list to identify items in classes defined in the electronic regulations and/or based on the additional information about the user. For example, the electronic service provider 110 may identify a class for each item of the item list that corresponds to a preferred payment method (e.g., a most financially sensible payment method) and/or that corresponds to other variable options of each item. In certain embodiments, the electronic service provider 110 may identify one or more alternative classes for each item. The alternative classes may generally correspond to alternative payment methods that may be used to purchase the items. In some embodiments, the electronic service provider may identify all possible classes (e.g., all possible payment methods) for each item and/or may sort the classes from the most preferred (e.g., most financially sensible) to the least preferred (e.g., least financially sensible).

In certain embodiments, the electronic service provider 110 may identify one or more classes for each item based on the additional information about the user. For example, the electronic service provider 110 may filter/narrow the classes determined in process block 208 to determine classes applicable to the user for each item. In some instances, certain classes (e.g., payment methods) may be unavailable to a user, such that the most preferred payment method for some items is unavailable. As such, the electronic service provider 110 may determine an optimal class available to the user for each item of the item list. As described herein, the electronic service provider 110 may identify the classes for each item based on the electronic regulations and/or the additional information about the user via one or more machine learning models.

In process block 210, the electronic service provider 110 may provide an indication of a class (e.g., preferred payment method) of each item to the cart 104 (e.g., to the API 112 for delivery to and/or retrieval by the cart 104). The class may indicate or include the preferred payment method for the item. In certain embodiments, providing the indication of the classes may include generating and/or providing a user interface including the indication, such as the user interface of FIG. 3 described below or portions of such a user interface.

Figure 3:
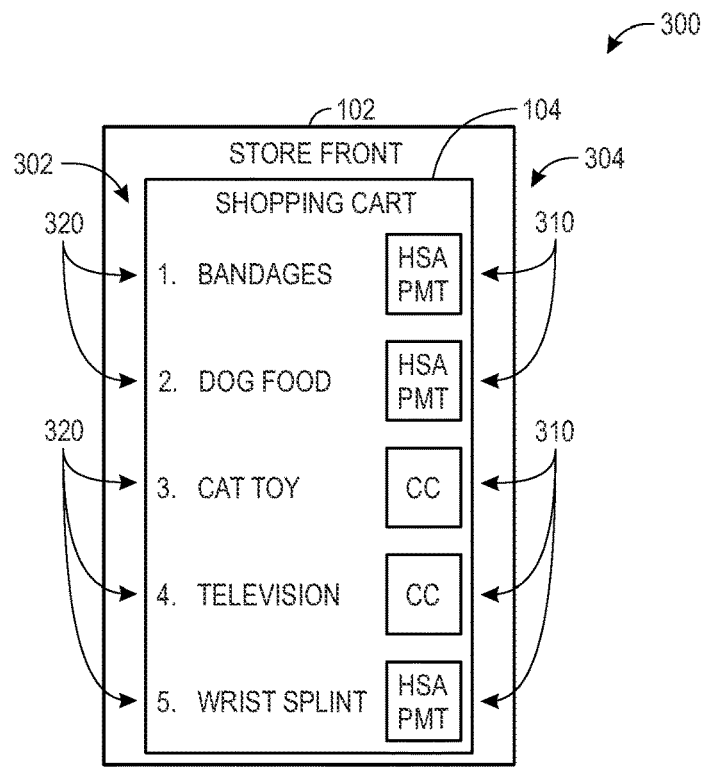
FIG. 3 is an interface representation displaying an item list of the user's shopping cart of the store front of FIG. 1 including the indication of the preferred payment methods, according to embodiments of the present disclosure.

FIG. 3 is an interface representation 300 displaying an item list 302 of the cart 104 of FIG. 1 including an indication of the preferred payment methods 304 (e.g., an indication of a class for each item of the item list 302), according to embodiments of the present disclosure. The interface representation 300 also depicts the store front 102 and the cart 104. The interface representation 300 may be generated and/or transmitted to a device of the user by the controller described herein.

As described above, the indication of the preferred payment methods 304 for each item may be a payment method available to the user and recommended by the electronic service provider 110. As illustrated, the indication is depicted as icons 310 adjacent to the item list 302. In certain embodiments, the icons 310 may be selectable icons, such that the user may approve or decline the recommended payment method for each item. For example, to decline the payment method for an individual item, the user may click/select the icon 310 next to that item, which may cause an additional prompt to be generated and/or displayed. The additional prompt may list alternative payment methods for selection by the user. For example, as described above, the electronic service provider 110 may determine multiple payment methods for some of all items of the item list 302. After receiving a user selection of an alternative payment method for a particular item, the icon 310 may change to display the alternative payment method. If the user does not select or change the payment method for items in the item list, the store front 102 may consider the payment method as approved by the user and proceed with the online transaction. In certain embodiments, some or all of the icons 310 may be static and not selectable, such as icons 310 for which there is only a single payment method available to the user. In some embodiments, an additional prompt may be generated in response the user selecting an icon 310, and the additional prompt may include selectable options to allow the user to approve or decline each recommended payment method.

In the illustrated embodiment, the item list 302 includes five items 320 in a list format. The items 320 include bandages, dog food, cat toy, television, and wrist splint. Additionally, the icons 310 include "HSA PMT" and "CC", which indicate healthcare spending account (HSA) payment and credit card, respectively. The HSA payment is the recommended/preferred payment method for the bandages, the dog food, and the wrist splint. The credit card is the recommended/preferred payment method for the cat toy and the television. To generate the indication of the preferred payment methods 304, the electronic service provider 110 may determine that the bandages and the wrist splint are related to first aid and health recovery, and therefore qualify for payment via the HSA. Additionally, the electronic service provider 110 may determine that the dog food qualifies for HSA payment, because the user of the online transaction owns a service dog that consumes dog food. Such information about the user may be included in a user profile stored in the user profile database 140. The service dog and products purchased for the service dog may be considered products under the relevant electronic regulations (e.g., regulations stored in electronic regulations database 142). Accordingly, the electronic service provider 110 may analyze the information and regulations to provide the HSA payment as the preferred payment method for the dog food.

The credit card payment option may be a default payment option for items that do not have a more financially suitable class and payment method. In certain embodiments, the electronic service provider may recommend a gift card, a debit card, and/or a specific credit card for each item. Information regarding gift cards, debit cards, and specific credit cards of the user may be included in the user's profile stored in the user profile database 140. In some embodiments, certain credit cards may offer more points and/or rewards relative to other credit cards for certain types of items. The electronic service provider 110 may review these aspects of the credit cards and recommend the credit cards offering the most points/rewards for certain items 320 of the item list 302.

The electronic service provider 110 (e.g., the controller of the electronic service provider 110) may generate the interface representation 300 and transmit the interface representation 300 to the user device 120 for display via the user interface 130. In certain embodiments, the electronic service provider 110 may generate only the indication of the preferred payment methods 304, such that the indication of the preferred payment methods 304 may be overlaid onto an interface including the cart 102 displaying the item list 302. While the illustrated item list 302 includes five items 320, it should be understood that any suitable number of items 302 are contemplated.

Figure 4:
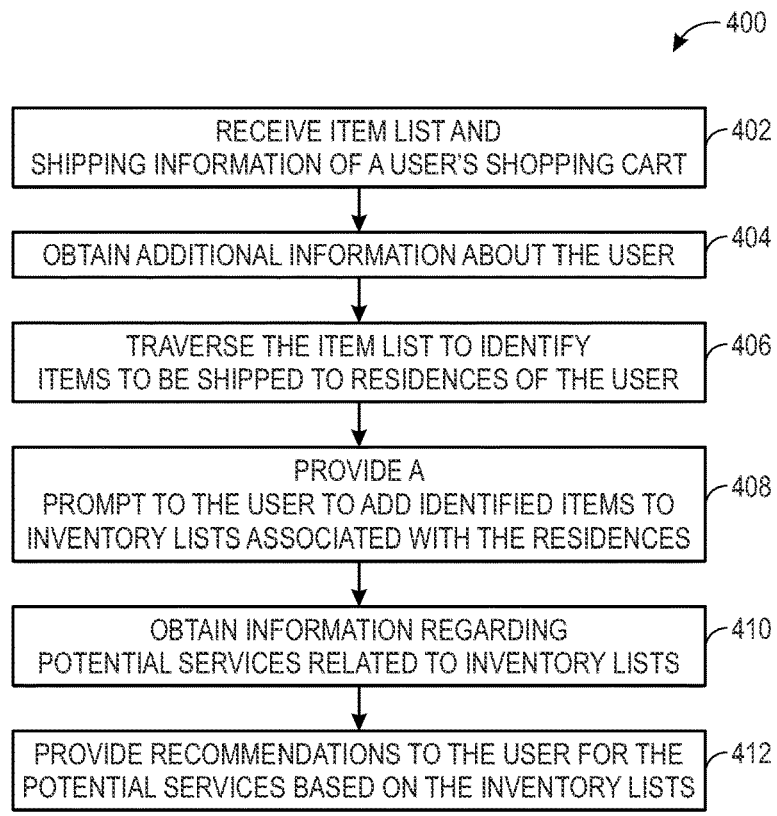
FIG. 4 is a flowchart illustrating a method for adding items of the user's shopping cart to inventory lists and offering services related to the inventory lists, which may be performed via the electronic service system of FIG. 1, according to embodiments of the present disclosure, according to embodiments of the present disclosure.

FIG. 4 is a flowchart illustrating a method 400 for adding items of the cart 104, such as some or all of the items 320 shown in FIG. 3, to inventory lists and offering services related to the inventory lists, which may be performed via the electronic service system 100 of FIG. 1 (e.g., performed via the electronic service provider 110 of the electronic service system 100), according to embodiments of the present disclosure, according to embodiments of the present disclosure. While the method 400 is described using steps in a specific sequence, it should be understood that the present disclosure contemplates that the described steps may be performed in different sequences than the sequence illustrated, and certain described steps may be skipped or not performed altogether. In some embodiments, the method 400 may be implemented by executing instructions stored in a tangible, non-transitory, computer-readable medium, such as the one or more memory devices, using a processor, such as the one or more processors.

As illustrated, in process block 402, the electronic service provider 110 may receive the item list and shipping information of the cart 104 of the store front 102 via the API 112. The item list may include information for each item, as described above. For each item in the item list, the shipping information may include a destination, a shipping type (e.g., ground, air), a shipping carrier, time periods for departure, transit, and/or arrival (e.g., times, dates, date ranges), and other suitable shipping information.

In process block 404, the electronic service provider 110 may obtain additional information about the user. As described above, the additional information may include a name, birthday, age, service and/or product information owned by the user or previously owned by the user (e.g., information regarding and/or related to services and/or products that may potentially be provided by the electronic service provider 110), assets, inventory lists, occupational information, residences (e.g., addresses, locations), and other information relevant to electronic services that may be provided by the electronic service provider 110.

In process block 406, the electronic service provider 110 may traverse the item list to identify items to be shipped to residences of the user. For example, the electronic service provider 110 may compare shipping destinations and/or addresses of each item, or the online transaction generally, to locations and/or addresses of the residences. Based on the shipping destinations or addresses matching the residence locations or addresses, the electronic service provider 110 may determine that those items may be added to inventory lists for the residences. For example, in response to the items of the item list being shipped to a single residence in Orlando, Florida, the electronic service provider 110 may obtain an inventory list for that residence and determine that the items should be added to the inventory list. If an inventory list does not exist for a residence or if an additional, new inventory list should be generated for the residence, the electronic service provider 110 may determine that the new inventory list including the identified items should be generated.

As used herein, an inventory list may generally refer to a list of items disposed in a user's residence. The inventory list may include a name, description, value, and other information about each item. The inventory list may be used to assess a value of the residence and/or for insurance purposes. The inventory list may also facilitate tracking items disposed in the residence, which may be useful if the user owns multiple residences.

In certain embodiments, the electronic service provider may determine whether items should be added to the inventory list by comparing prices and/or values of the items to a threshold amount. In response to the prices or values of certain items exceeding or being at the threshold amount, the electronic service provider 110 may determine that those items should be added to the inventory list. In response to the prices or value of certain items being less than the threshold amount, the electronic service provider 110 may determine that those items should not be added to the inventory list. The electronic service provider 110 may determine the threshold amount based on a current value of the user's residence (e.g., including or not including a value of existing items located in the residence), input from the user, and other factors.

In process block 408, the electronic service provider 110 may provide a prompt to the user to add the identified items to the inventory lists associated with the residences of the user. The prompt may include options and/or selectable icons that allow the user to accept or decline adding the items to the inventory list. In certain embodiments, the prompt may provide options to add each item individually to the inventory list. An example of an interface representation including such a prompt is described in reference to FIG. 5.

In process block 410, the electronic service provider 110 may obtain information regarding potential services related to the inventory lists. For example, based on updates to the inventory lists (e.g., items being added or removed from the inventory lists) and/or new inventory lists, the electronic service provider 110 may determine that new or different services may be applicable to the user. In certain embodiments, the service may be providing and/or adjusting a renter's insurance plan or a homeowner's insurance plan that the electronic service provider 110 identified based on the inventory list. In some embodiments, the insurance plan may provide more appropriate coverage for the inventory list relative to a previous insurance plan.

In process block 412, the electronic service provider 110 may provide recommendations to the user regarding potential services based on the inventory lists. The recommendations may be automatically displayed and may allow the user to approve or decline the potential services. In certain embodiments, the potential services may be automatically implemented based on updates to the inventory list and/or creation of a new inventory list. In such embodiments, the user may preselect an option allowing the electronic service provider 110 to automatically implement/update the potential services based on the updates to and/or creation of the inventory list. For example, the electronic service provider 110 may automatically adjust insurance coverage provided for a residence of the user based on an adjustment to an inventory list of the residence (e.g., an adjustment to the value of the residence indicated by adding item(s) to the inventory list and/or removing item(s) from the inventory list).

Figure 5:
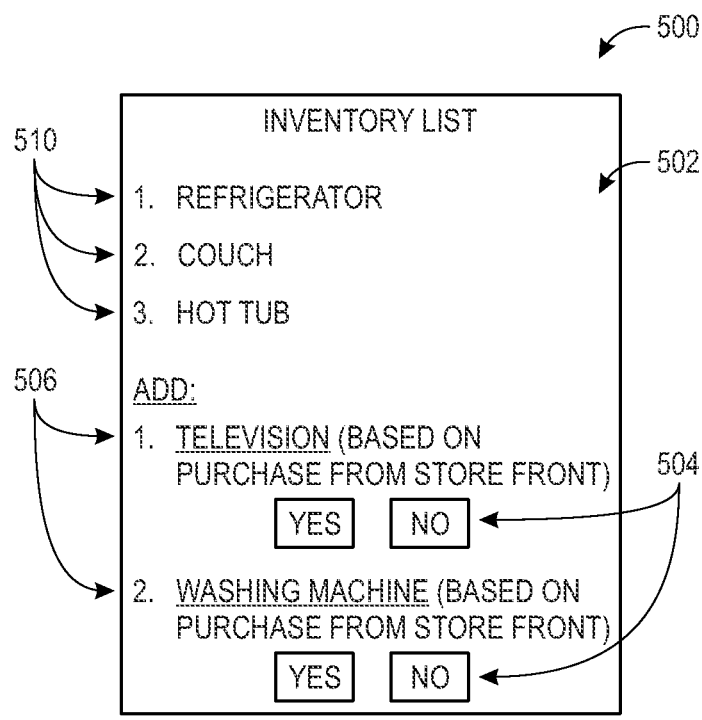
FIG. 5 is an interface representation displaying an inventory list and options for adding items from the user's shopping cart to the inventory list, according to embodiments of the present disclosure.

FIG. 5 is an interface representation 500 displaying an inventory list 502 and selectable options 504 for adding items 506 from the cart 104 to the inventory list 502, according to embodiments of the present disclosure. The inventory list 502 may be an existing inventory list for a residence of the user that includes items 510 (e.g., the items 510 may be disposed at the residence and may have previously been added to the inventory list 502). In certain embodiments, the user may have existing services and/or products related to the inventory list 502, such as an existing insurance plan providing coverage for the items 510 of the inventory list 502. The electronic service provider 110 may generate the interface representation 500 and transmit the interface representation 500 to the user device 120 for display via the user interface 130.

The items 506 may be identified by the electronic service provider 110 as items of the cart 104 that may be added to the inventory list 502. For example, as described herein, the electronic service provider 110 may determine that prices and/or values of the items 506 exceed a threshold amount, such that the user may want to add the items 506 to the inventory list 502. Additionally, the electronic service provider 110 may determine that the items 506 are being shipped to the residence. Accordingly, the electronic service provider 110 may generate and provide the interface representation 500 including the selectable options 504 allowing the user to add the items 506. In the illustrated embodiment, the selectable options 504 include "YES" and "NO" options. The user may accept adding one or both items 506 by selecting/clicking the "YES" option and/or may decline adding one or both items 506 by selecting/clicking the "NO" option. In other embodiments, the interface representation 500 may include other features allowing the user to interact with the inventory list 502 (e.g., to add or remove items from the inventory list 502). In certain embodiments, the electronic service provider 110 may display all items from the cart 104 regardless of value, such that the user may choose which items to be added to the inventory list 502.

In some embodiments, the electronic service provider 110 may generate a new inventory list and an interface representation displaying the new inventory list. The interface representation may be presented to the user for approval of the new inventory list. The user may accept or decline the new inventory list. In certain embodiments, the user may accept only certain items (e.g., items recommended to be included by the electronic service provider 110) in the new inventory list.

As described above, based on the user updating the inventory list 502 and/or accepting the new inventory list, the electronic service provider 110 may identify potential services related to the updated and/or new inventory list, such as updated or new insurance plans. The electronic service provider 110 may generate an additional interface representation displaying indications of the potential services and selectable options allowing the user to accept or decline some or all of the potential services.

Figure 6:
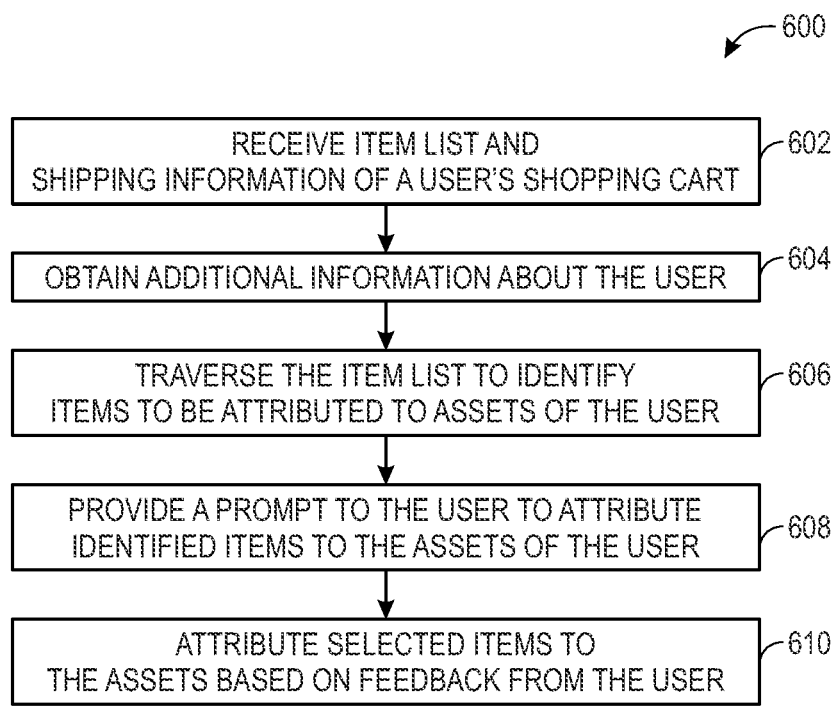
FIG. 6 is a flowchart illustrating a method for attributing items of the user's shopping cart to assets of the user, which may be performed via the electronic service system of FIG. 1, according to embodiments of the present disclosure, according to embodiments of the present disclosure.

FIG. 6 is a flowchart illustrating a method 600 for attributing items of the cart 104 to assets of the user, which may be performed via the electronic service system 100 of FIG. 1 (e.g., performed via the electronic service provider 110 of the electronic service system 100), according to embodiments of the present disclosure, according to embodiments of the present disclosure. While the method 600 is described using steps in a specific sequence, it should be understood that the present disclosure contemplates that the described steps may be performed in different sequences than the sequence illustrated, and certain described steps may be skipped or not performed altogether. In some embodiments, the method 600 may be implemented by executing instructions stored in a tangible, non-transitory, computer-readable medium, such as the one or more memory devices, using a processor, such as the one or more processors.

As illustrated, in process block 602, the electronic service provider 110 may receive the item list and shipping information of the cart 104 of the store front 102 via the API 112. As described above, the item list may include information for each item, and the shipping information may include any information of the online transaction relevant to shipping each item.

In process block 604, the electronic service provider 110 may obtain additional information about the user. As described above, the additional information may include a name, birthday, age, service and/or product information owned by the user or previously owned by the user (e.g., information regarding and/or related to services and/or products that may potentially be provided by the electronic service provider 110), assets, inventory lists, occupational information, residences (e.g., addresses, locations), and other information relevant to electronic services that may be provided by the electronic service provider 110. In certain embodiments, assets of the user may include rental properties or properties that otherwise produce an income for the user, such that the properties may be considered assets.

In process block 606, the electronic service provider 110 may traverse the item list to identify items to be attributed to the assets of the user. For example, the electronic service provider 110 may determine that such items should be attributed to the assets, or that the user may want to attribute the items, based on the items being shipped to the assets (e.g., rental properties or other assets). Specifically, in response to a shipping address/location of one or more items matching an address/location of an asset, the electronic service provider 110 may determine that the items should be attributed to the asset.

In certain embodiments, only certain types of items may be attributed to an asset. For example, in the context of rental properties as assets, only items that are used to maintain the rental property (e.g., cleaning supplies, maintenance equipment) and/or that add value to the rental property may be attributed to the rental property as an asset. Information regarding which items may be attributed to certain assets may be stored in the electronic regulations database 142 and retrieved by the electronic service provider 110 based on types of the assets of the user.

In process block 608, the electronic service provider 110 may provide a prompt to the user to attribute the identified items to the assets. The prompt may include options and/or selectable icons that allow the user to accept or decline attributing the items to the assets. In certain embodiments, the prompt may provide options to add each item individually to each individual asset. An example of an interface representation including such a prompt is described in reference to FIG. 7.

In process block 610, the electronic service provider 110 may attribute the items to the assets of the user based on feedback from the user. For example, in response to the user accepting the recommendation to attribute the items to the assets, the electronic user interface 110 may attribute the items to the assets. The electronic service provider 110 may generate and store a record indicating that the items are attributed to the assets, such that the record may be later retrieved and used to analyze and provide electronic services for the assets. Such analysis and electronic services may be related to tax purposes, insurance purposes, and other purposes related to the assets. For example, the electronic service provider may determine an adjustment to an insurance plan associated with an asset of the user based on the user attributing an item to the asset and resulting increase in a value of the asset. The adjustment may include an increase to an insurance cost (e.g., premium, deductible) and/or an increase a coverage amount of the insurance plan (e.g., a monetary amount payable for a claim filed under the insurance plan).

Figure 7:
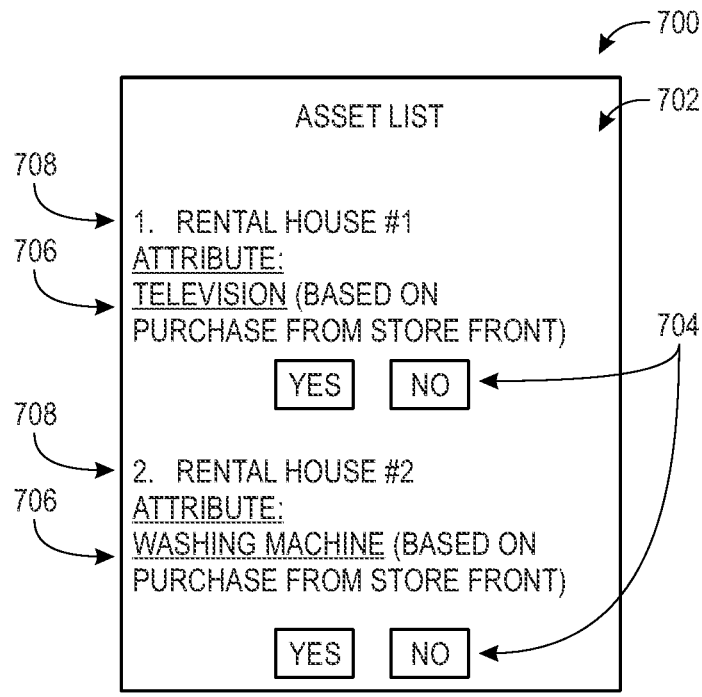
FIG. 7 is an interface representation displaying an asset list and options for attributing items from the user's shopping cart to assets of the asset list, according to embodiments of the present disclosure.

FIG. 7 is an interface representation 700 displaying an asset list 702 and selectable options 704 for attributing items 706 from the cart 104 to assets 708 of the asset list 702, according to embodiments of the present disclosure. The asset list 702 may include some or all assets of the user. In the illustrated embodiment, the assets 708 of the assets list 702 include rental house #1 and rental house #2. In other embodiments, the asset list 702 may include other assets, such as vehicles, businesses, organizations, land properties, and other suitable assets. The electronic service provider 110 may generate the interface representation 700 and transmit the interface representation 700 to the user device 120 for display via the user interface 130.

The items 706 may be identified by the electronic service provider 110 as items of the cart 104 that may be attributed to the assets 708. As illustrated, the items 706 include a television and a washing machine. The electronic service provider 110 may determine that the television may be attributed to the rental house #1 based on a shipping address/location of the television matching an address/location of the rental house #1, and that the washing machine may be attributed to the rental house #2 based on a shipping address/location of the washing machine matching an address/location of the rental house #2. Accordingly, the electronic service provider 110 may generate and provide the interface representation 700 including the selectable options 704 allowing the user to attribute the items 706 to the assets 708. In the illustrated embodiment, the selectable options 704 include "YES" and "NO" options for each item 706. The user may accept attributing one or both items 706 by selecting/clicking the "YES" option and/or may decline attributing one or both items 706 by selecting/clicking the "NO" option. In other embodiments, the interface representation 700 may include other features allowing the user to interact with the asset list 702 (e.g., to attribute items to assets of the asset list 702).

Based on the user updating the assets 708 by attributing the items 706, the electronic service provider 110 may identify potential services related to the updated assets 708, such as updated or new insurance plans. The electronic service provider 110 may generate an additional interface representation displaying indications of the potential services and selectable options allowing the user to accept or decline some or all of the potential services. For example, in response to the user attributing an item to a particular asset, the electronic service provider 110 may determine that the value of the asset has increased and may determine, recommend, and/or automatically implement a corresponding increase in insurance coverage for the asset.

Figure 8:
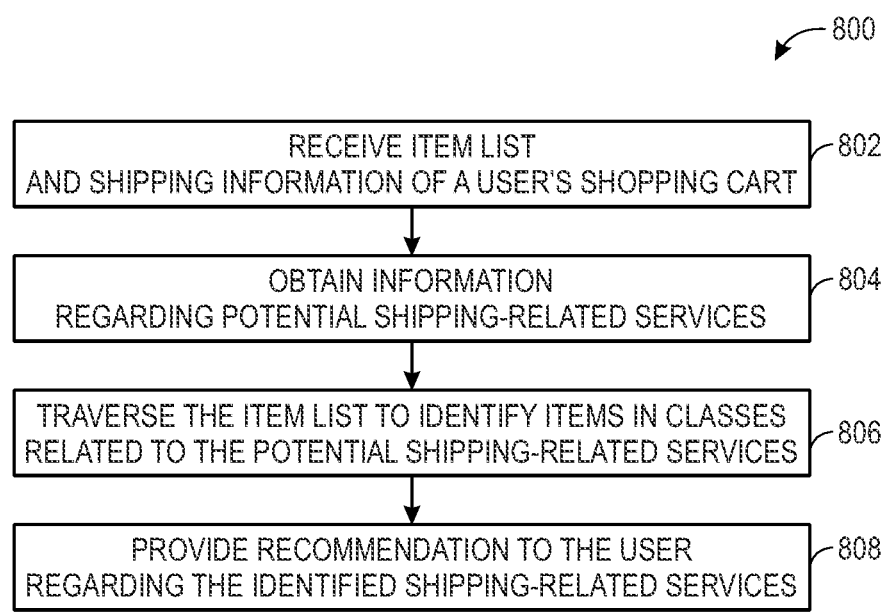
FIG. 8 is a flowchart illustrating a method for offering shipping-related services for items of the user's shopping cart, which may be performed via the electronic service system of FIG. 1, according to embodiments of the present disclosure, according to embodiments of the present disclosure.

FIG. 8 is a flowchart illustrating a method 800 for offering shipping-related services for items of the cart 104, which may be performed via the electronic service system 100 of FIG. 1 (e.g., performed via the electronic service provider 110 of the electronic service system 100), according to embodiments of the present disclosure, according to embodiments of the present disclosure. While the method 800 is described using steps in a specific sequence, it should be understood that the present disclosure contemplates that the described steps may be performed in different sequences than the sequence illustrated, and certain described steps may be skipped or not performed altogether. In some embodiments, the method 800 may be implemented by executing instructions stored in a tangible, non-transitory, computer-readable medium, such as the one or more memory devices, using a processor, such as the one or more processors.

As illustrated, in process block 802, the electronic service provider 110 may receive the item list and shipping information of the cart 104 of the store front 102 via the API 112. As described above, the item list may include information for each item, and the shipping information may include any information of the online transaction relevant to shipping each item.

In process block 804, the electronic service provider 110 may obtain information regarding potential shipping-related services. The potential shipping-related services may include alternative shipping methods (e.g., relative to shipping methods suggested/provided by the store front 102), alternative shipping carriers (e.g., relative to shipping carriers suggested/provided by the store front 102), insured shipping plans, and other shipping-related services that may be provided for items of the cart 104. In certain embodiments, the information regarding potential shipping-related services may be stored in the service profiles database 144.

For example, each shipping-related service may be stored as a service profile and/or as a service lookup table that identifies classes of items (e.g., objects) that qualify for the shipping-related service. Each class may include characteristics of items that qualify for the shipping-related service.

In process block 806, the electronic service provider 110 may traverse the item list to identify items in classes defined in the service profiles. For example, the electronic service provider 110 may identify items in classes corresponding to shipping-related services, such that the items qualify for the shipping-related services. For example, the electronic service provider 110 may match characteristics of the items to characteristics of the classes to determine that the items fall into the classes. In some embodiments, the electronic service provider may identify all possible classes (e.g., all possible shipping-related services) for each item.

By way of example, only certain items may qualify for insured shipping, such as items having a price or value exceeding a threshold amount, items including electronics and/or electrical components, and items including glass and/or ceramics. The items may include certain characteristics (e.g., high price/value, electronic, glass, ceramic) that are defined in a class qualified for insured shipping. The characteristics and/or each individual item may be stored in a service profile lookup table corresponding to insured shipping. The electronic service provider 110 may refer to such a service profile lookup table to determine whether items quality for insured shipping. A service profile lookup table corresponding to alternative shipping methods and/or carriers may include characteristics identifying sizes and/or weights of items qualifying for such shipping-related services.

In process block 808, the electronic service provider 110 may provide recommendations to the user regarding the identified shipping-related services. The recommendations may be automatically displayed and may allow the user to approve or decline the shipping-related services. In certain embodiments, the shipping-related services may be automatically implemented. In such embodiments, the user may preselect an option allowing the electronic service provider 110 to automatically implement the shipping-related services based on the electronic service provider 110 identifying the services.

Figure 9:
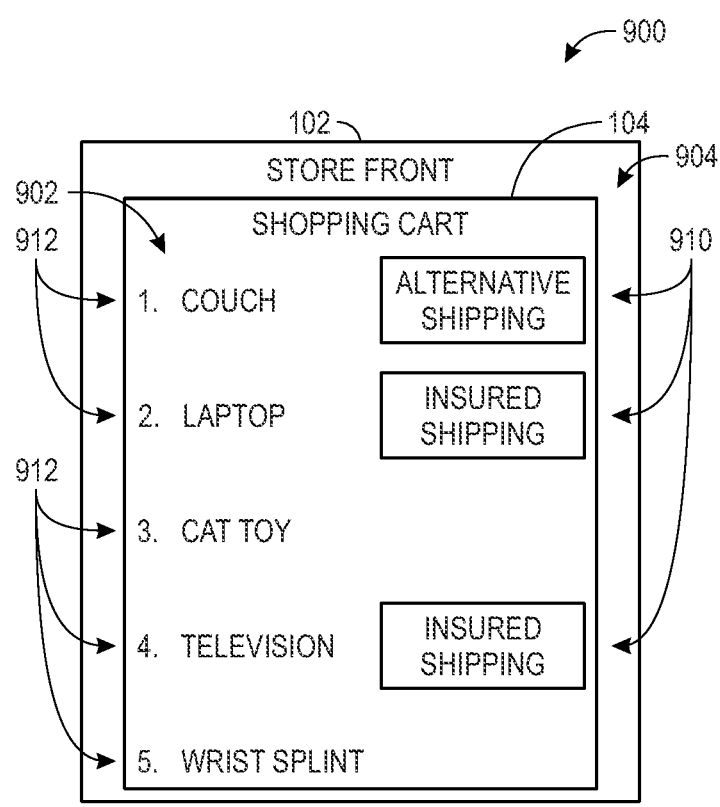
FIG. 9 is an interface representation displaying an item list of the user's shopping cart of the store front of FIG. 1 including the options for shipping-related services, according to embodiments of the present disclosure.

FIG. 9 is an interface representation 900 displaying an item list 902 of the cart 104 of the store front 102 of FIG. 1 including an indication of options 904 for shipping-related services, according to embodiments of the present disclosure. The interface representation 900 also depicts the store front 102 and cart 104.

As described above, the indication of the options 904 for shipping-related services may be optional services determined by the electronic service provider 110 to be available for certain items of the item list 902. As illustrated, the indication of the options 904 is depicted as icons 910 adjacent to the item list 902. In certain embodiments, the icons 910 may be selectable icons, such that the user may approve or decline the shipping-related service for each item. For example, to decline the shipping-related service for an individual item, the user may click/select the icon 910 next to that item, which may cause an additional prompt to be generated and/or displayed. The additional prompt may allow the user to decline the shipping-related service. If the user does not select or click the icons 910, the store front 102 may consider the shipping-related services as approved by the user and proceed with the online transaction. In other embodiments, if the user does not select or click the icons 910, the store front 102 may consider the shipping-related services as declined by the user and proceed with default shipping methods for the online transaction.

In the illustrated embodiment, the item list 902 includes five items 912 in a list format. The items 912 include a couch, a laptop, a cat toy, a television, and a wrist splint. Additionally, the icons 910 include shipping-related services of alternative shipping and insured shipping. An alternative shipping method is the recommended for the couch, and insured shipping is recommended for the laptop and the television. To generate the indication of the options 904 for shipping-related services, the electronic service provider 110 may determine that the couch is a relatively large item that qualifies for shipping via an alternative shipping method and/or carrier. Additionally, the electronic service provider 110 may determine that the laptop and the television qualify for insured shipping, because the laptop and the television include electronics and/or a price/value of each item exceeds a threshold amount.

The electronic service provider 110 may generate the interface representation 900 and transmit the interface representation 900 to the user device 120 for display via the user interface 130. In certain embodiments, the electronic service provider 110 may generate only the indication of the options 904, such that the indication of the options 904 may be overlaid onto an interface including the cart 102 displaying the item list 902.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more tangible, non-transitory, computer-readable media, comprising instructions that, when executed by one or more processors, cause the one or more processors to:
   receive, from an application programming interface (API), a list of objects corresponding to an online transaction;
   retrieve a user profile from a user profile database, wherein the user profile is based on an identity of a user;
   retrieve a classification lookup table based on the list of objects;
   identify one or more potential classes of the list of objects using the user profile and the classification lookup table, wherein the one or more potential classes is specific to the user based on the user profile, wherein identifying the one or more potential classes comprises utilizing machine learning circuitry to:
      receive transaction data and additional information about the user;
      perform iterative optimization of an objective function based on training data, wherein the training data comprises the transaction data, and wherein the optimized objective function enables the machine learning circuitry to provide an output associated with new inputs not included in the training data; and
      generate a prediction of the one or more potential classes for the list of objects;
   provide, to the API, the one or more potential classes of each object for processing of the online transaction; and
   cause generation and rendering of an interface representation at a user device, wherein the interface representation displays the list of objects, wherein the interface representation comprises an icon disposed adjacent to each object in the list of objects, and wherein an indication of a preferred payment method is dynamically overlaid onto the icon based on the identification of the one or more potential classes of each object in the list of objects.

2. The one or more tangible, non-transitory, computer-readable media of claim 1, wherein the classification lookup table comprises the one or more potential classes, and wherein each class of the one or more potential classes is defined by class characteristics.

3. The one or more tangible, non-transitory, computer-readable media of claim 2, wherein identifying the one or more potential classes of each object comprises traversing the one or more potential classes to match class characteristics of the potential class for each object to object characteristics of the object.

4. The one or more tangible, non-transitory, computer-readable media of claim 1, wherein the instructions, when executed by the one or more processors, cause the one or more processors to:
   in response to a class of one or more first objects of the list of objects being in the one or more potential classes, provide, to the API, the class of the one or more first objects; and
   in response to an alternative class of one or more second objects of the list of objects not being in the one or more potential classes:
      identify the alternative class of each second object of the one or more second objects using the classification lookup table; and
      provide, to the API, the alternative class of each second object.

5. The one or more tangible, non-transitory, computer-readable media of claim 1, wherein the instructions, when executed by the one or more processors, cause the one or more processors to:
   receive, from the API, shipping information corresponding to the online transaction;
   determine one or more electronic services to be performed for the list of objects based on the shipping information;
   generate an indication of the one or more electronic services; and
   provide, to the API, the indication of the one or more electronic services.

6. The one or more tangible, non-transitory, computer-readable media of claim 5, wherein the indication comprises an interface representation comprising a plurality of selectable options for one or more objects of the list of objects, and wherein the plurality of selectable options are configured for approval or declination of the one or more electronic services.

7. A method, comprising:
receiving, from an application programming interface (API), a list of objects corresponding to an online transaction;
retrieving a user profile from a user profile database, wherein the user profile is based on an identity of a user;
retrieving a classification lookup table based on the list of objects;
identifying one or more potential classes of the list of objects using the user profile and the classification lookup table, wherein the one or more potential classes is specific to the user based on the user profile, wherein identifying the one or more potential classes comprises utilizing machine learning circuitry to:
  receive transaction data and additional information about the user;
  perform iterative optimization of an objective function based on training data, wherein the training data comprises the transaction data, and wherein the optimized objective function enables the machine learning circuitry to provide an output associated with new inputs not including the training data; and
  generate a prediction of the one or more potential classes for the list of objects;
providing, to the API, the one or more potential classes of each object for processing of the online transaction; and
causing generation and rendering of an interface representation at a user device, wherein the interface representation displays the list of objects, wherein the interface representation comprises an icon disposed adjacent to each object in the list of objects, and wherein an indication of a preferred payment method is dynamically overlaid onto the icon based on the identification of the one or more potential classes of each object in the list of objects.

8. The method of claim 7, wherein the classification lookup table comprises the one or more potential classes, and wherein each class of the one or more potential classes is defined by class characteristics.

9. The method of claim 8, wherein identifying the one or more potential classes of each object comprises traversing the one or more potential classes to match class characteristics of the potential class for each object to object characteristics of the object.

10. The method of claim 7, comprising:
in response to a class of one or more first objects of the list of objects being in the one or more potential classes, providing, to the API, the class of the one or more first objects; and
in response to an alternative class of one or more second objects of the list of objects not being in the one or more potential classes:
  identifying the alternative class of each second object of the one or more second objects using the classification lookup table; and
  providing, to the API, the alternative class of each second object.

11. The method of claim 7, comprising:
receiving, from the API, shipping information corresponding to the online transaction;
determining one or more electronic services to be performed for the list of objects based on the shipping information;
generating an indication of the one or more electronic services; and
providing, to the API, the indication of the one or more electronic services.

12. The method of claim 11, wherein the indication comprises an interface representation comprising a plurality of selectable options for one or more objects of the list of objects, and wherein the plurality of selectable options are configured for approval or declination of the one or more electronic services.

13. A system, comprising:
one or more processors; and
a non-transitory memory storing instructions that, when executed by the one or more processors, cause the one or more processors to perform actions comprising:
  receiving, from an application programming interface (API), a list of objects corresponding to an online transaction;
  retrieving a user profile form a user profile database, wherein the user profile is based on and identity of a user;
  retrieving a classification lookup table based on the list of objects;
  identifying one or more potential classes of the list of objects using the user profile and the classification lookup table, wherein the one or more potential classes is specific to the user based on the user profile, wherein identifying the one or more potential classes comprises utilizing machine learning circuitry to:
    receive transaction data and additional information about the user;
    perform iterative optimization of an objective function based on training data, wherein the training data comprises the transaction data, and wherein the optimized objective function enables the machine learning circuitry to provide an output associated with new inputs not included in the training data; and
    generate a prediction of the one or more potential classes for the list of objects;
  providing, to the API, the one or more potential classes of each object for processing of the online transaction; and
  causing generation and rendering of an interface representation at a user device, wherein the interface representation displays the list of objects, wherein the interface representation comprises an icon disposed adjacent to each object in the list of objects, and wherein an indication of a preferred payment method is dynamically overlaid onto the icon based on the identification of the one or more potential classes of each object in the list of objects.

14. The system of claim 13, wherein the classification lookup table comprises the one or more potential classes, and wherein each class of the one or more potential classes is defined by class characteristics.

15. The system of claim 14, wherein identifying the one or more potential classes of each object comprises traversing the one or more potential classes to match class characteristics of the potential class for each object to object characteristics of the object.

16. The system of claim 13, wherein the actions comprise:
in response to a class of one or more first objects of the list of objects being in the one or more potential classes, providing, to the API, the class of the one or more first objects; and in response to an alternative class of one or more second objects of the list of objects not being in the one or more potential classes:
  identifying the alternative class of each second object of the one or more second objects using the classification lookup table; and
  providing, to the API, the alternative class of each second object.

17. The system of claim 13, wherein the actions comprise:
receiving, from the API, shipping information corresponding to the online transaction;
determining one or more electronic services to be performed for the list of objects based on the shipping information;
generating an indication of the one or more electronic services; and
providing, to the API, the indication of the one or more electronic services.

* * * * *